(12) United States Patent
Strangas et al.

(10) Patent No.: US 6,411,005 B1
(45) Date of Patent: Jun. 25, 2002

(54) SYSTEM TO IMPROVE THE TORQUE SMOOTHNESS OF AN ELECTRIC MACHINE

(75) Inventors: Elias G. Strangas, East Lansing; John William Kelly, Okemos; John Michael Miller, Saline, all of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/502,591

(22) Filed: Feb. 11, 2000

(51) Int. Cl.$^7$ ................................................ H02K 1/12
(52) U.S. Cl. ...................... 310/254; 310/164; 310/216; 318/801; 318/254
(58) Field of Search ................................ 310/254, 258, 310/259, 216, 179, 198, 180, 164; 318/806, 811, 727, 798, 254

(56) References Cited

U.S. PATENT DOCUMENTS

| | | | |
|---|---|---|---|
| 4,035,712 A | | 7/1977 | Yarrow et al. |
| 4,455,522 A | | 6/1984 | Lipo |
| 4,461,986 A | * | 7/1984 | Maynard et al. ............. 318/778 |
| 4,547,713 A | * | 10/1985 | Langley et al. ............. 318/254 |
| 4,563,606 A | * | 1/1986 | Fukasawa et al. .......... 310/208 |
| 4,743,777 A | | 5/1988 | Shilling et al. |
| 4,792,742 A | | 12/1988 | Fujimoto et al. |
| 4,808,903 A | * | 2/1989 | Matsui et al. ................ 318/800 |
| 5,017,855 A | * | 5/1991 | Byers et al. ................. 318/811 |
| 5,079,467 A | * | 1/1992 | Dorman ....................... 310/156 |
| 5,304,883 A | * | 4/1994 | Denk ........................... 310/180 |
| 5,510,687 A | * | 4/1996 | Ursworth et al. ............ 318/727 |
| 5,650,707 A | | 7/1997 | Lipo et al. |
| 5,689,170 A | * | 11/1997 | Ishikawa ..................... 318/811 |
| 5,764,036 A | | 6/1998 | Vaidya et al. |
| 5,903,128 A | * | 5/1999 | Sakakibara et al. ......... 318/721 |
| 5,969,496 A | * | 10/1999 | Yamada et al. ............. 318/715 |

\* cited by examiner

Primary Examiner—Nicholas Ponomarenko
Assistant Examiner—Thanh Lam
(74) Attorney, Agent, or Firm—Jennifer Stec

(57) ABSTRACT

A stator for an induction machine comprises a cylindrical core that has a plurality of inner and outer slots and a plurality of toroidal coils wound about the core and laid in the inner and outer slots. Each toroidal coil occupies a single inner slot and is laid in the adjacent associated outer slot to minimize the distance the coils extend from the end faces of the core thereby minimizing the length of the induction machine. The coils are encapsulated in a material that fills any voids to provide a thermal path for uniform heat dissipation. In operation, a controller is coupled to three current sensors and detects the current of only three phases. These phases are then used to calculate the current of the adjacent six phases, thereby, allowing for better control of the electric machine.

13 Claims, 6 Drawing Sheets

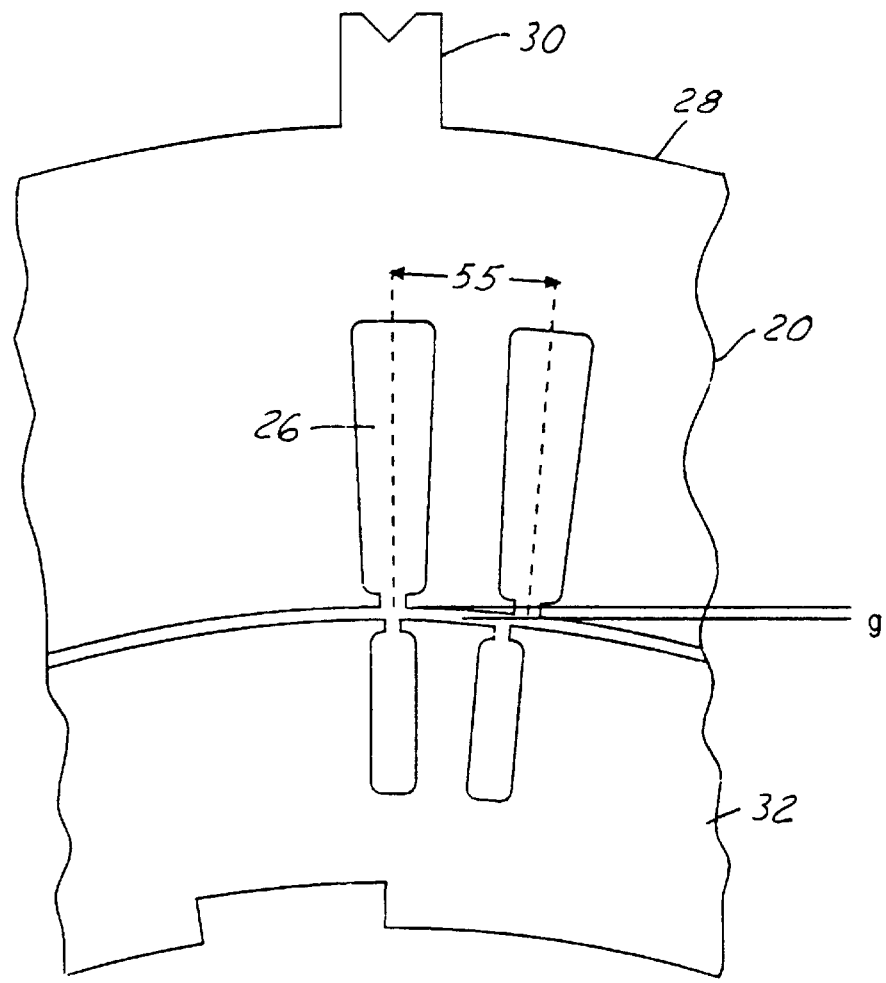
FIG. 2
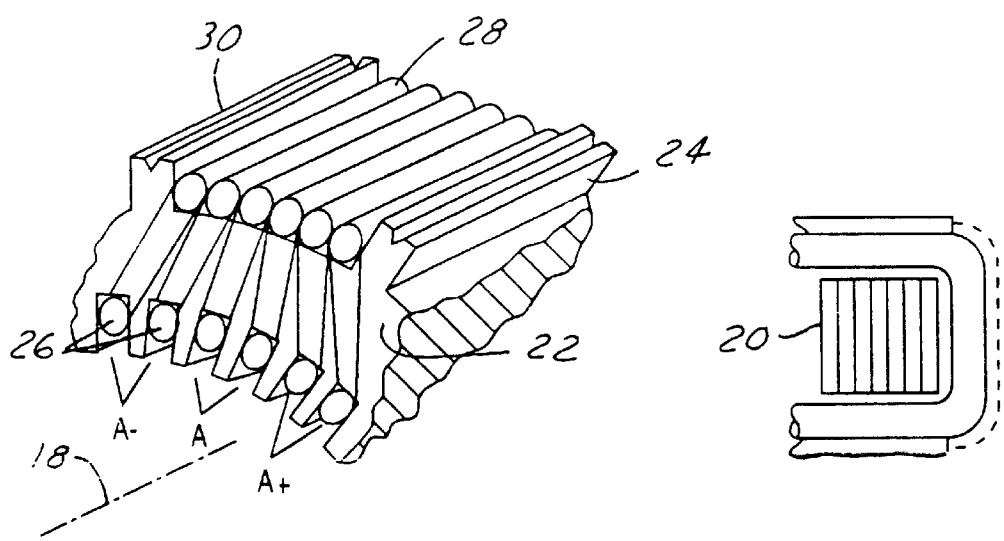
FIG. 3  FIG. 4

Q = 72 SLOTS $\qquad q = \dfrac{Qs}{mp}$ p =

| q | 2 | 4 | 6 | 8 | 10 | 12 |
|---|---|---|---|---|---|---|
| 2 | | | | | | |
| 3 | 12 | 6 | 4 | 3 | 2.4 | ②  |
| 4 | | | | | | |
| 5 | | | | | | |
| 6 | 6 | 3 | 2 | 1.5 | 1.2 | 2 |
| 7 | | | | | | |
| 8 | | | | | | |
| 9 | | | | | | |
| 10 | 4 | ② | 1.33 | 1.0 | 0.8 | 0.67 |
| 11 | | | | | | |
| 12 | | | | | | |
| 13 | | | | | | |
| 14 | | | | | | |
| 15 | | | | | | |
| 16 | | | | | | |
| 17 | | | | | | |
| 18 | 2 | 1 | .67 | 0.5 | 0.4 | 0.33 |
| • | | | | | | |
| • | | | | | | |
| • | | | | | | |
| • | | | | | | |
| 36 | 1 | 0.5 | | | | | m =

ELECTRONIC POLE HOP

FIG. 5

SYSTEM TO IMPROVE THE TORQUE SMOOTHNESS OF AN ELECTRIC MACHINE

FIELD OF INVENTION

The present invention relates generally to induction machines, and, more particularly to a system to improve the torque smoothness of an electric machine.

BACKGROUND OF THE INVENTION

In the automotive industry, package space is budgeted for under hood and engine components. Starters and alternators with toroidal windings offer a space savings over stators with conventional lap windings. Lap windings require end space that increases the length of the machine. End space is needed to route a coil from one stator slot to another stator slot that may be several slots away according to the pitch or spacing of the coils.

The end turn, the length of the coil that extends from between the slots from coil side to the other coil side, extends beyond the stator laminations. This increases the length of the stator by the distance required for the coil to make the turn from one slot for one side of the coil to the corresponding slot for the other side of the coil. Toroidal windings conserve space between the large turning area for end turns is not required. Toroidal coils are wound about the core with one side of the core laid in the slot on the interior of the laminations and the other side of the coil being laid on the outer periphery of the laminations. However, even with toroidal windings, there are end turns that extend beyond the laminations because of the space required for the coil to make the turn to go from one side of the laminations to the other side of the laminations.

In a vehicle, the alternator is subjected to constant operation generating heat that must be dissipated. Conventional toroidal windings have coils surrounding the core or the stator compounding the problem of heat dissipation because the core or stator cannot be used to dissipate coil heat, as is the case with lap windings. Hot spots, therefore, exist where the coil is not in uniform contact with the core laminations. Further, toroidal coils are layered placing one layer closer to a heat sink so that the heat is not transferred uniformly. Another problem with some toroidal windings is that the inner diameter of the core is smaller than the outer diameter so that spacers must be hand positioned when assembling the coils to prevent coil movement. Adding spacers during assembly complicates the assembly process and slows production. It is, therefore, desirable to have a stator with toroidal coils that have minimal end turn and promote heat dissipation.

To solve these problems, typically, alternators and starters with high phase counts are used to minimize toroidal windings. A problem with high phase order AC drive systems is the necessity of measuring phase currents so that the electric machine phase currents can be regulated. For example, in the specific case of a 9-phase induction machine, this means eight current sensors. Because of the complexity of using eight current sensors, the automotive industry has found alternatives allowing them to use only two current sensors.

Compared to 3 phase-4 pole configuration, the 9 phase-4 pole configuration increases torque smoothness. However, due to the complexities in implementation, in addition to current sensor costs, 9-phase control is not practical. Instead, conventional three-phase control is employed. Only two currents sensors are needed and control strategies of three phase systems are well defined. However, in this induction machine, going from nine to three phase control results in MMF wave resolution reduction. The quality of the MMF waves directly effects the torque smoothness. Therefore, there is a desire to maintain 9-phase quality MMF resolution, while using conventional three-phase control.

SUMMARY OF THE INVENTION

It is, therefore, an object of the invention to reduce weight and improve reliability of an automotive starter/alternator. Another object of the invention is to improve the torque smoothness of an automotive starter/alternator.

In one aspect of the invention, a stator for an induction machine comprises a cylindrical core that has a plurality of inner and outer slots and a plurality of toroidal coils wound about the core and laid in the inner and outer slots. Each toroidal coil occupies a single inner slot and is laid in the adjacent associated outer slot to minimize the distance the coils extend from the end faces of the core thereby minimizing the length of the induction machine. The coils are encapsulated in a material that fills any voids to provide a thermal path for uniform heat dissipation.

The area of the outer slots is equal to the area of the inner slots. When the inner slots are full, the coils fit exactly in the outer slots. An exact fit increases mechanical integrity of the structure, and a single layer winding minimizes end turn build up while providing a thermal path.

The present invention enables arbitrary combination of the number of poles and phases. Its principle of operation will be illustrated on an example of a 4-pole, 9-phase alternator and a 12-pole, 3-phase motor.

In operation, a controller is coupled to three current sensors and detects the current of only three phases. These phases are then used to calculate the current of the adjacent six phases, thereby, allowing for better control of the electric machine.

The present invention thus achieves a system for improving the torque smoothness of an electric machine. This allows lower weight and higher reliability in automotive applications. Additional advantages and features of the present invention will be come apparent from the description that follows and may be realized by the means of the instrumentalities and combinations particularly pointed out in the appended claims taken in conjunction with the accompanying drawings.

BRIEF DESCRIPTION OF THE DRAWINGS

In order that the invention may be well understood, there will now be described some embodiments thereof given by way of example reference being made to the accompanying drawings in which:

FIG. 2 is a somewhat enlarged view of a section of the stator lamination and its relationship to the rotor according to one embodiment of the present invention;

FIG. 3 is a prospective view of a section of the stator core showing a coil laid in the inner and outer slots according to one embodiment of the present invention;

FIG. 4 is a diagram end view of the stator core and coil showing the end turn according to one embodiment of the present invention;

FIG. 5 is a chart illustrating the number of slots/poles/phases for slot combinations for the pole phase modulated starter alternator induction machine according to one embodiment of the present invention;

DETAILED DESCRIPTION OF THE PREFERRED EMBODIMENTS

Figure 1:
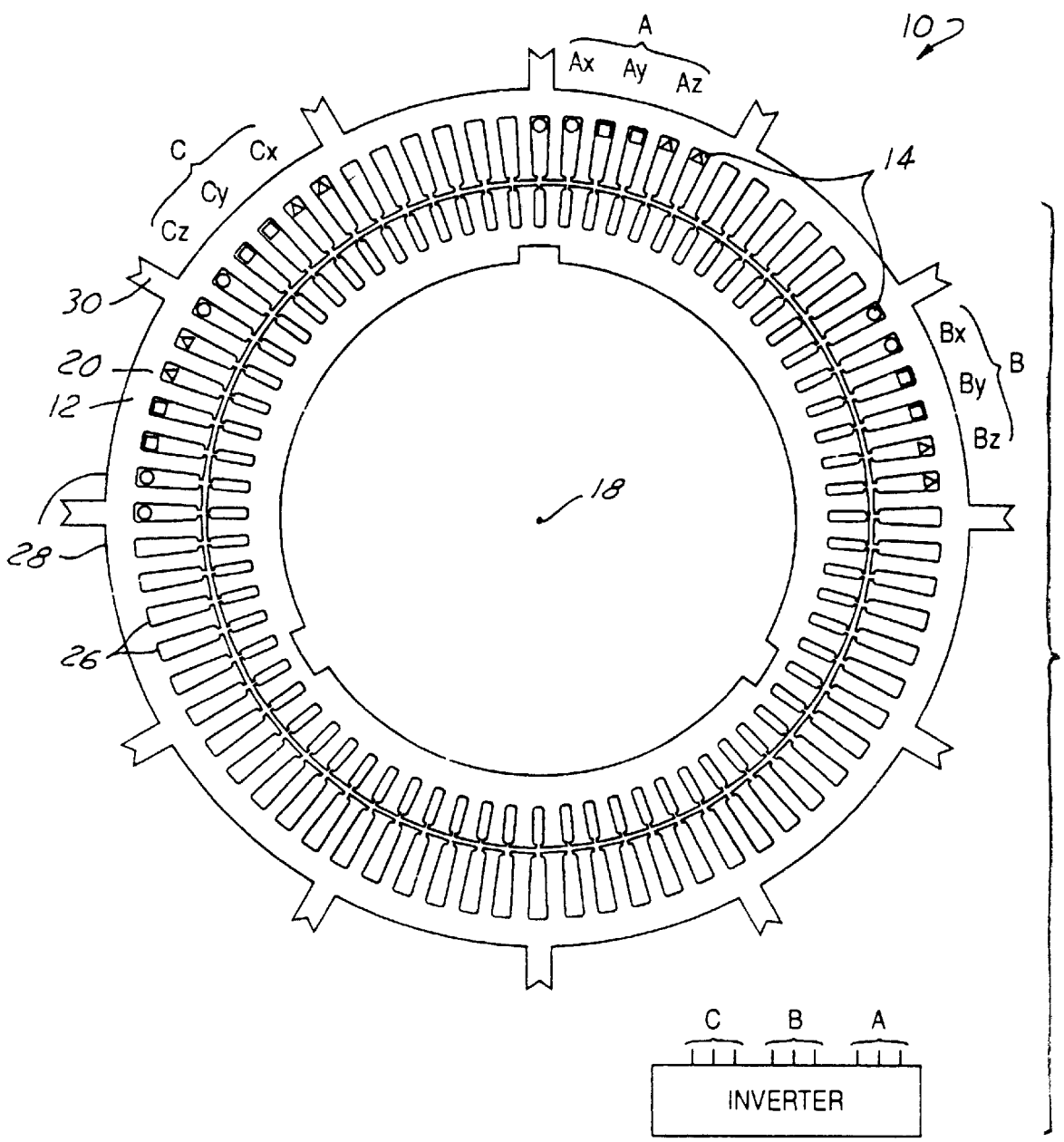
FIG. 1 is a wiring diagram illustrating windings on an example of a stated core of an induction machine for a vehicle connected to an inverter according to one embodiment of the present invention.

Referring to FIGS. 1–4, a stator 10 for an induction machine for use as an alternator or starter in a vehicle for example, contains a stator core 12 with a plurality of coils 14. The coils 14 are connected to an inverter 16 for multiphase operation.

The core 12 has a hollow cylindrical shape with a longitudinal axis 18 and is formed of a plurality of steel laminations 20. Core 12 has first and second end faces 22 and 24 each oriented perpendicular to the longitudinal axis 18 and an inner periphery and an outer periphery. The inner periphery defines a plurality of inner slots 26 equally spaced about the inner periphery that are open on the hollow interior of the core for receiving the coils 14. The outer periphery defines a plurality of outer slots 28 that are equally spaced about the outer periphery and defines a plurality of tabs 30 that are also equally spaced about the outer periphery. The tabs and outer slots are equal in number with each outer slot existing between consecutive tabs and with each tab existing between consecutive outer slots.

Tabs 30 protrude radially outward from the lamination. When assembled, tabs 30 extend the length of the core with the sides of each tab parallel to one another so that the bottom of an outer slot is slightly narrower than its top because of the curvature of the core. The number of inner slots 26 is a multiple of the number of outer slots 28.

Referring to FIG. 5, slot combinations for the pole-phase modulated starter/alternator of the present invention are selected to give smooth torque operation in the alternator mode which is a 4-pole, 9-phase operation. For the preferred design, the following relationships are true:

$Q_s$=72=number of outer stator slots;

$Q_r$=87=number of rotor slots;

P=12/4=number of poles; and m=9/3=number of phases.

For example, in a conventional 4-pole, 10 horsepower induction machine, the slot combinations are generally $Q_s/Q_r$=36/44 to minimize slot ripple torque. In a pole hopping design such as the present pole-phase modulated starter-alternator, the goal is q=2 slots/pole/phase according to the table of FIG. 5 giving q=$Q_s$/mP.

For the starter-alternator to achieve a 3:1 pole change during the transition from engine cranking to alternator mode, it is desirable that an integral number of coils exist per pole. For a given selection in the number of coils/pole/phase and for the design to accommodate a 12-pole to 4-pole transition, a shift in the phase number is required. As can be seen from the table of FIG. 5, in the cranking mode with a 12-pole flux pattern and 3-phase excitation to a S/A wound with two coils/pole/phase, every six coils define a magnetic pole. The rotor with $Q_r$=87 slots can be considered to have mq=$Q_r$/P =87/12=7.25 during cranking mode and mq=87/4= 21.75 during alternator mode. For the cage rotor, it is not appropriate to think of phases or coils/pole/phase, rather, to consider the cage rotor as an approximation to a continuous conductor sheet.

Winding the stator with two coils per pole per phase as a 4-pole winding having 9-phases permits the electronic grouping of coils into a 3-phase system with 12 poles. Other pole number combinations are allowed, but at the expense of a higher number of phases, hence, electronic complexity. For example, to realize a P=12-pole-8-pole-4-pole electronic changeover will require m=18 phases with q=1 slot per pole per phase.

As illustrated in FIG. 1, there are 12 outer slots 28 and 72 inner slots 26 configured about the rotor 32. Rotor 32 is configured with 87 slots on its outer periphery. A gap g on the order of 0.6 mm exists between the stator and rotor. There is a desired relationship between gap g and the pitch of the stator given by $g/\tau_{ss}$<0.01. The total cross-sectional area of the inner slots is equal to the total cross-sectional area of the outer slots so that coils from six inner slots fill one outer slot. When the inner slots are full of windings, there is exactly enough space for the windings in the outer slots to be placed in a single layer.

Single layer construction allows the coil to abut the core end faces or be laid very closely to the end faces with only a small amount of space to allow for the turning radius of the coil. Because the area of six inner slots equals the area of one outer slot, the coils may be stacked in two layers in the inner slots and still be stacked only one layer in the outer slot providing a compact construction. The compact construction is possible even with two coils in the inner slots because transposition from the bottom slot to the top slot requires minimum crossover and clearance. The crossover occurs between adjacent positions in an outer slot and a single inner slot. Only the coils involved in the transposition add to end turn build up which is minimal. This is in sharp contrast to conventional lap windings where end build up to at any point involves more than adjacent coils and routinely involves a number of coils equal to the coil pitch.

The coil is preferably encapsulated in an epoxy resin material. Preferably, a pottery compound of silicon coated aluminum nitride in an epoxy resin binder is used, such as a SCAN manufactured by the Dow Chemical Company. When applied in a liquid form, the epoxy resin fills any voids existing between the coils and the core laminations forming a unitary structure. Because a unitary structure is formed, the heat transfer will be even. The lack of voids prevents the formation of hot spots so that heat dissipation and transference is uniform. The epoxy resin also bonds the coil to the core for structural integrity and mechanical strength. Because a unitary structure is formed with epoxy encapsulation, heat can be radiated outward from the core, removed from the outer periphery of the core assisted by a fan, and/or dissipated through the housing in which the stator is mounted through direct contact with the plurality of tabs which are also used for mounting the stator in the machine housing.

Figure 6:
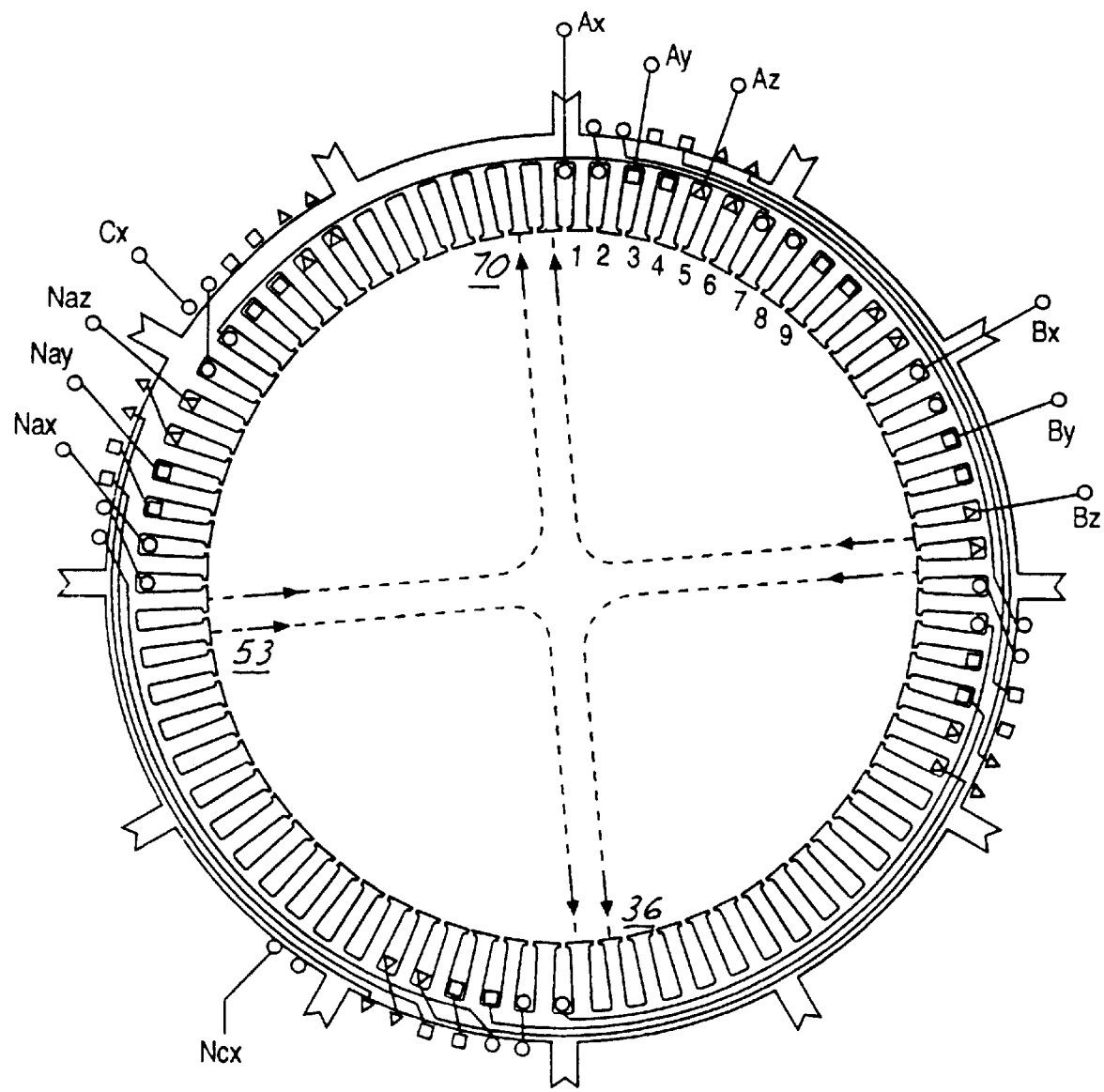
FIG. 6 is a diagram illustrating magnetic pole formation for 4-pole operation.

Referring to FIG. 6, coil connections are illustrated for 4-pole magnetic flux pattern. For reference, the inner slots are numbered clockwise from 1 to 72. Four magnetic poles are formed that are spaced 90° apart. For the 4-pole 9-phase configuration, q=2 slots/pole/phase so that the coil for phase $A_x$ occupies two inner slots, namely, slots 1 and 2, while phase $A_y$ occupies slots 3 and 4 and $A_z$ occupies slots 5 and 6. The coils are connected in series with the coil for phase $A_x$ in one pole connected to the coil for phase $-A_x$ in another pole so that current flow is in opposite directions to create opposite poles. Thus, for 4-pole operation, the coil in slots 1–2 generate one pole while the coils in slots 19–20 generate an adjacent pole of opposite polarity.

Phase $A_x$, $A_y$, $A_z$ respectively start at slots 1, 3 and 5, continue at slots 19, 21 and 23, slots 37, 39 and 41, and end at slots 55, 57 and 59 with neutrals connected at slots 56, 58 and 60. Phases $B_x$, $B_y$, $B_z$ respectively start at slots 13, 15 and 17 whiles phases $C_x$, $C_y$, $C_z$ respectively start at slots 61, 63 and 65. Beginning with the outer slot opposite inner slots 1–6 and proceeding clockwise are the phases for group A, then –C, B, then –A, C –B, etc.

Figure 7A:
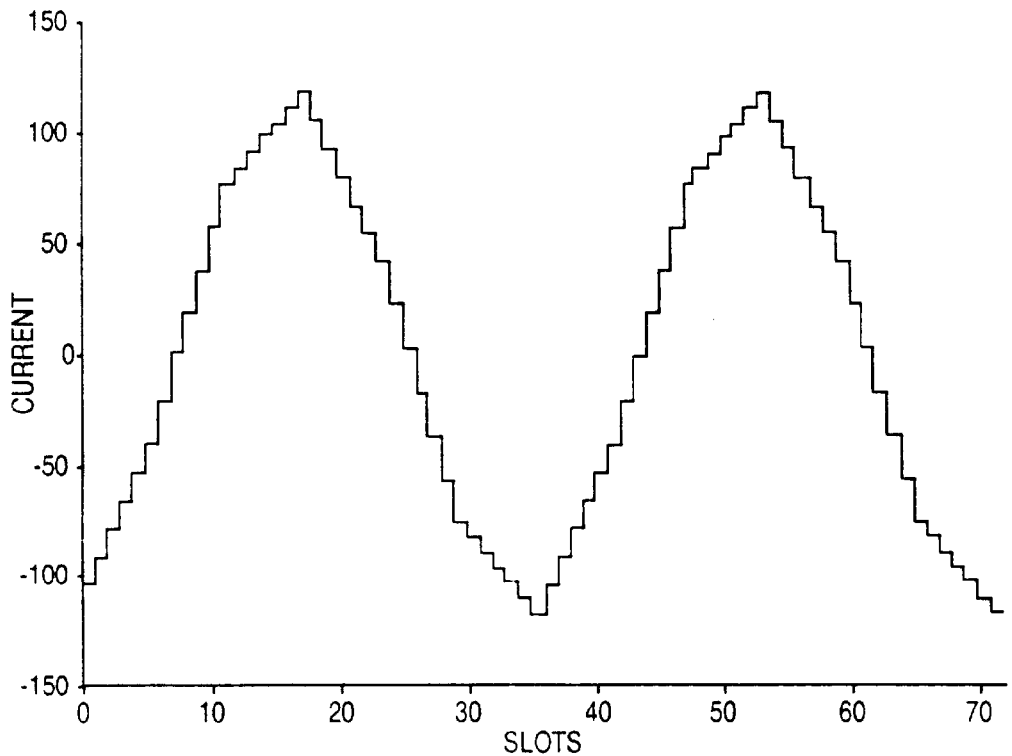
FIGS. 7A and 7B are graphs illustrating the improvements in the 3 phase-4 pole MMF waveform at 140 degrees in accordance with one embodiment of the present invention.
Figure 7B:
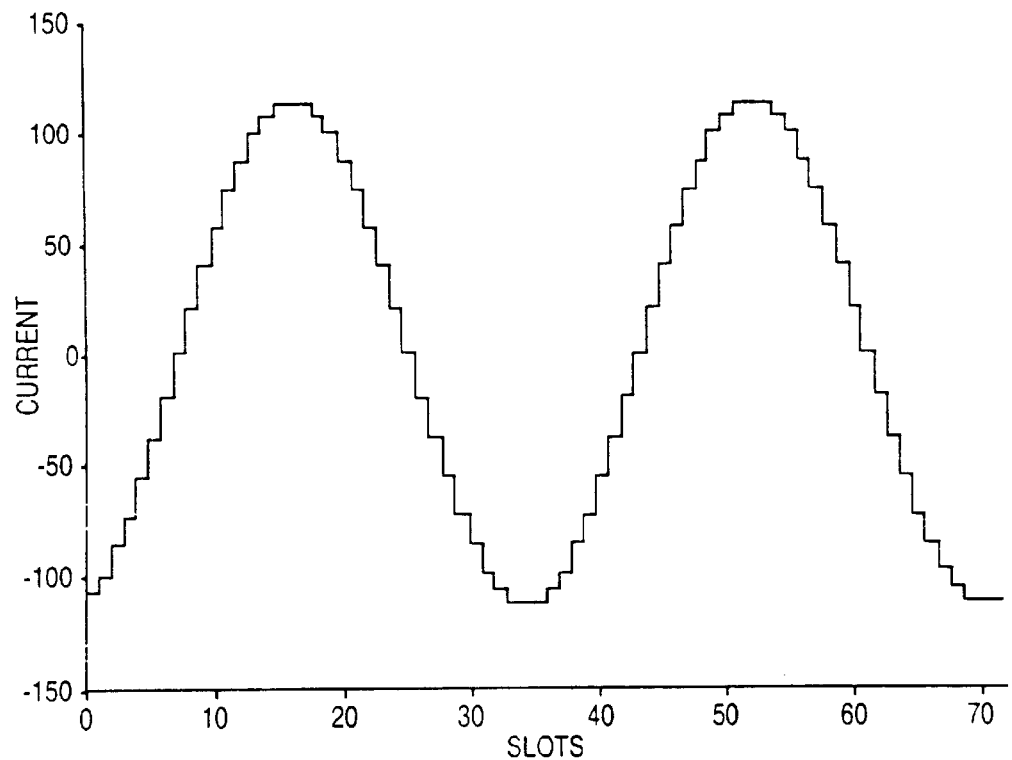
Figure 8A:
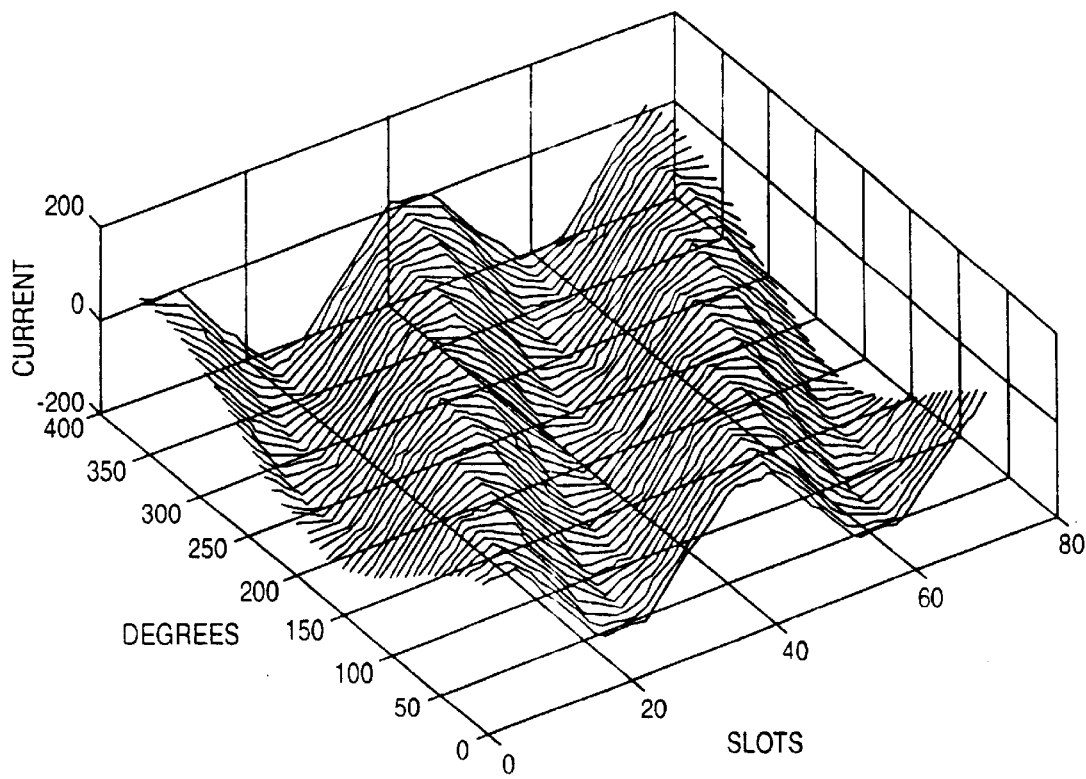
FIGS. 8A and 8B are graphs illustrating the improvements in the 9 phase-4 pole MMF waveform for on electrical cycle in accordance with one embodiment of the present invention.
Figure 8B:
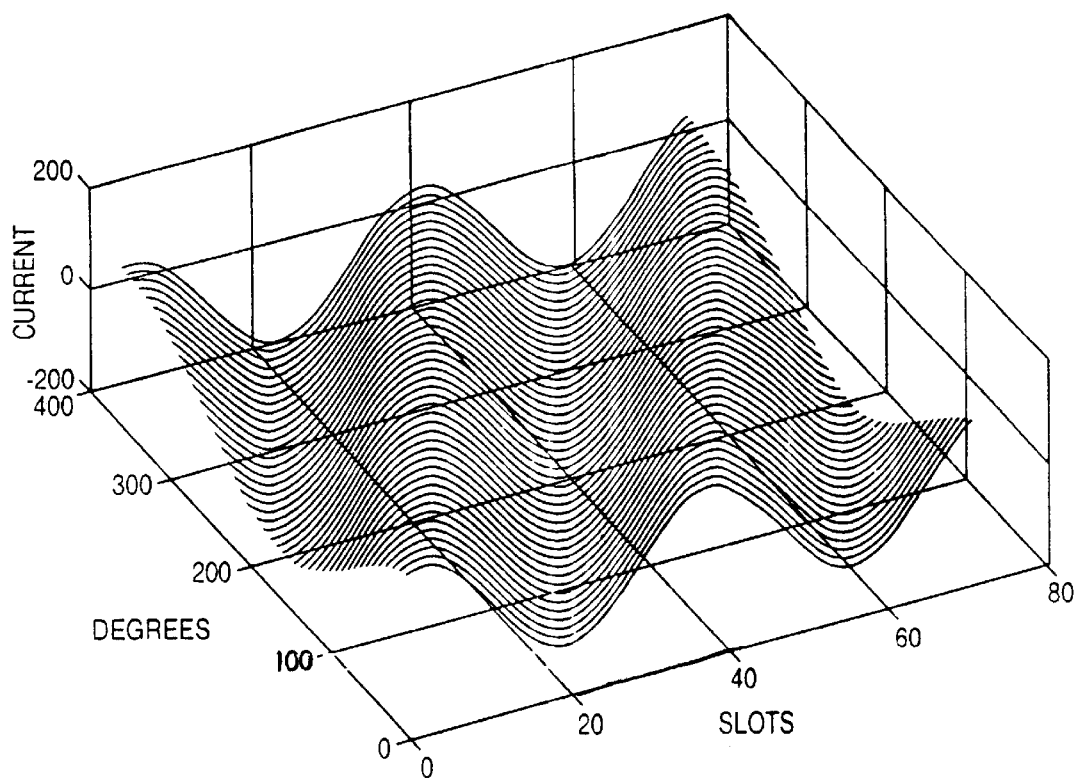

The effect of the present invention for 3phase operation can be seen in FIGS. 7A and 7B, graphs illustrating the improvements in the 3 phase-4 pole MMF waveform at 140 degrees in accordance with one embodiment of the present invention. The effect of the present invention for 9 phase operation can be seen in FIGS. 8A and 8B, graphs illustrating the improvements in the 9 phase-4 pole MMF waveform for on electrical cycle in accordance with one embodiment of the present invention In operation, it is possible to control a multiphase induction machine by measuring and controlling only a fraction of the total phases while still retaining the highest possible MMF resolution. In this particular case, a 9-phase induction machine is controlled by only measuring three currents, a first phase current, a second phase current and a third phase current. Each of these three phase currents acts as a master current. A controller is coupled to three current sensors. From the three master phase currents, six additional slave phase currents can be calculated by offsetting the three measured master phase currents. These slave currents are phase shifted in either a positive or negative direction.

For example, referring to FIG. 3, for measured phase A, phase A+ and A– are established by adding and subtracting respectively 20° from A. Similarly, for measured phase B and C, phases B+, B1, C+, and C– are established by adding and subtracting respectively 20° from B and C. All nine phases are then feed to a 9-phase inverter. Therefore, the 9-phase machine can be controlled as if it were a 3-phase machine without sacrificing MMF resolution.

More specifically, a controller is coupled to three current sensors. Each current sensor detects one phase current; a first phase current of a first phase, a forth phase current of a forth phase and a seventh phase current of a seventh phase. The controller then phase shifts the first phase current by approximately +20° to generate a second phase current and phase shifts the first phase current by approximately –20° to generate a third phase current. Likewise, the controller phase shifts the forth phase current by approximately +20° to generate a fifth phase current and phase shifts the forth phase current by approximately –20° to generate a sixth phase current. Finally, the controller phase shifts the seventh phase current by approximately +20° to generate a eight phase current and phase shifts the seventh phase current by approximately –20° to generate a ninth phase current. The controller then uses all nine phase currents to control the electric machine.

It is to be understood that the preceding description of the preferred embodiment is merely illustrative of some of the many specific embodiments that represent applications for the principles of the present invention. Clearly, numerous and other arrangements would be evident to those skilled in the art without departing from the scope of the invention as defined by the following claims.

What is claimed is:

1. A stator for an induction machine, comprising:

a cylindrical core having a longitudinal axis, inner and outer peripheries, first and second end faces, a plurality of inner slots extending longitudinally along said inner periphery between said first and second end faces, and a plurality of outer slots extending longitudinally along said inner periphery between said first and second end faces, each of said outer slots being associated with several adjacent inner slots;

a plurality of toroidal coils wound about said core and laid in said inner and outer slots, each of said toroidal coils occupying a single inner slot and being laid in said associated outer slot to thereby minimize distance said coil extends from said end faces; and a controller coupled to said stator, said controller having control logic operative to detect a first phase current of one said toroidal coil and calculate a second phase current of an adjacent toroidal coil.

2. A stator, as recited in claim 1, wherein said stator has a number of magnetic poles.

3. A stator, as recited in claim 2, wherein the number of inner slots is a multiple of said number of magnetic poles.

4. A stator, as recited in claim 1, wherein the total cross-sectional area of said outer slots equals approximately the total cross-sectional area of said inner slots.

5. A stator, as recited in claim 1, wherein said coils are encapsulated in an epoxy resin with said epoxy resin filling any voids existing between said coils and said end faces and said core.

6. A stator, as recited in claim 1, wherein said coils are encapsulated in a pottery compound containing silicon coated aluminum nitride in an epoxy resin binder with said compound filling any voids existing between said coils and said end faces and said core.

7. A stator, as recited in claim 1, wherein said coils are configured for operation with an arbitrary number of phases.

8. A stator for an induction machine, comprising:

a cylindrical core having a longitudinal axis, inner and outer peripheries, first and second end faces, a plurality of inner slots extending longitudinally along said inner periphery between said first and second end faces, and a plurality of outer slots extending longitudinally along said inner periphery between said first and second end faces, each of said outer slots being associated with several adjacent inner slots;

a plurality of toroidal coils wound about each of said toroidal coils occupying a single inner said core and laid in said inner and outer slots, slot and being laid in said associated outer slot to minimize distance said coils extend from said end faces and thereby minimize length of said induction machine, said toroidal coils being configured for an arbitrary pole phase modulation number of phases and poles for cranking and an arbitrary number of poles for alternator duty; and a controller coupled to said stator and a first current sensor, said controller having control logic operative to detect a first phase current of one said toroidal coil and calculate a second phase current of an adjacent toroidal coil.

9. A stator, as recited in claim 8, wherein said coils are encapsulated in an epoxy resin with said epoxy resin filling any voids existing between said coils and said end faces and said core.

10. A stator, as recited in claim 8, wherein said coils are encapsulated in a pottery compound containing silicon coated aluminum nitride in an epoxy resin binder with said compound filling any voids existing between said coils and said end faces and said core.

11. A stator, as recited in claim 8, wherein said stator has a number of magnetic poles.

12. A stator, as recited in claim 11, wherein the number of inner slots is a multiple of said number of magnetic poles.

13. A stator, as recited in claim 8, wherein the total cross-sectional area of said outer slots equals approximately the total cross-sectional area of said inner slots.

* * * * *

UNITED STATES PATENT AND TRADEMARK OFFICE
CERTIFICATE OF CORRECTION

| | |
|---|---|
| PATENT NO. | : 6,411,005 B1 |
| APPLICATION NO. | : 09/502591 |
| DATED | : June 25, 2002 |
| INVENTOR(S) | : Elias G. Grangas, John William Kelly and John Michael Miller |

It is certified that error appears in the above-identified patent and that said Letters Patent is hereby corrected as shown below:

In the Claims:

Claim 8:

Column 6, Lines 50-52, should read as follows: --a plurality of toroidal coils wound about said core and laid in said inner and outer slots, each of said toroidal coils occupying a single inner slot and being laid in--

Signed and Sealed this

Twenty-second Day of May, 2007

JON W. DUDAS
*Director of the United States Patent and Trademark Office*